T. W. KIRKMAN.
GOVERNOR FOR SPRING MOTORS.
APPLICATION FILED MAY 8, 1917.

1,236,449.

Patented Aug. 14, 1917.

Inventor
Thomas W. Kirkman
By his Attorney
Robert M. Pierson

UNITED STATES PATENT OFFICE.

THOMAS W. KIRKMAN, OF NEW YORK, N. Y.

GOVERNOR FOR SPRING-MOTORS.

1,236,449. Specification of Letters Patent. Patented Aug. 14, 1917.

Application filed May 8, 1917. Serial No. 167,300.

*To all whom it may concern:*

Be it known that I, THOMAS W. KIRKMAN, a citizen of the United States, residing at New York city, in the county of New York and State of New York, have invented certain new and useful Improvements in Governors for Spring-Motors, of which the following is a specification.

This invention relates to spring-propelled motors such as those used in phonographs. When the brake is applied suddenly to the edge of the turn-table, the inertia of the governor weights, whose shaft turns at about 1200 R. P. M., tends to keep them revolving, and is the cause of frequent breakage of the springs on which said weights are mounted. The object of my invention is to avoid such breakage, and to that end I provide a suitable form of slipping device or friction between the hub of the weight-supporting springs and the governor shaft which will allow the weights to keep revolving after the shaft has been stopped, until they are gradually arrested by friction.

Of the accompanying drawings.

Figure 1:
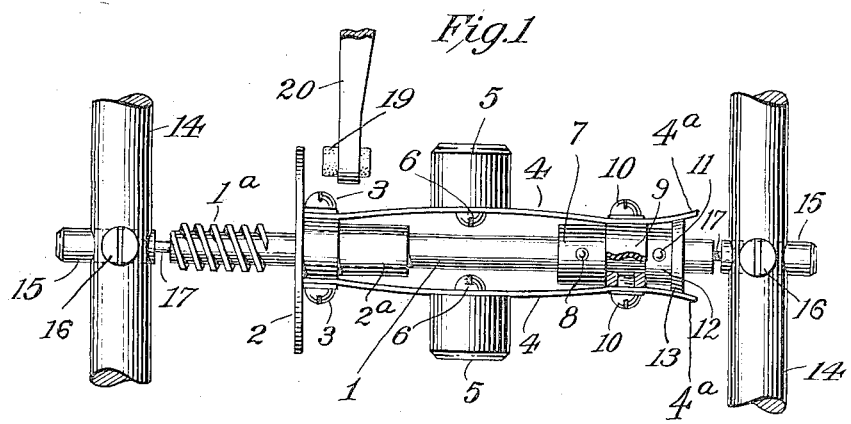
Figure 1 is a side elevation showing the governor of a talking-machine motor embodying my invention.
Figure 2:
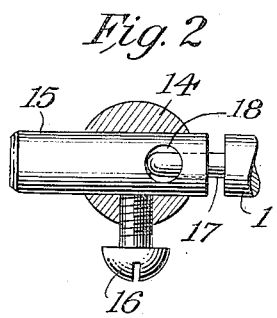
Fig. 2 is a horizontal section through one of the supporting posts, showing the shaft bearing and journal.
Figure 3:
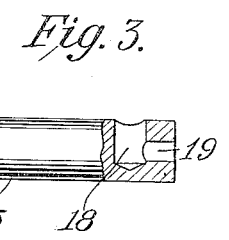
Fig. 3 is a detail elevation of the removable bearing member.

In the drawings, 1 is the horizontal governor shaft having a worm 1ª at one end, driven in the usual way by a worm-gear (not shown). 2 is the braking disk formed on a sleeve 2ª which is freely slidable along the shaft and is also adapted to rotate thereon. To this sleeve are attached by screws 3 one end of a pair of flat governor springs 4, to which latter the governor weights 5 are secured by screws 6.

7 is a collar fastened to shaft 1 by a pin 8 and 12 is another collar similarly fastened by a pin 11. Between the two collars is mounted a third collar or hub 9 to which the other ends of the springs 4 are secured by screws 10, the springs being extended at 4ª beyond said screws and frictionally engaging a conical flange 13 formed on collar 12. Hub 9 is free to turn on the shaft between the two fixed collars, except for the friction of the spring ends against said flange.

Centrifugal force, throwing the governor weights outwardly against the tension of the springs, draws disk 2 to the right, and when it encounters the felt block 19 on the end of arm 20, a further increase of speed is prevented, arm 20 being adjustable in the usual way to vary the number of revolutions per minute to which the governor holds its shaft and the turn-table geared thereto.

It will be evident that when shaft 1 is suddenly stopped by the application of the brake to the edge of the turn-table, the weights 5 will continue to revolve for a few turns until they are gradually brought to rest by the friction of the spring-ends against flange 13, and thus all danger of breaking the springs is avoided.

I further provide a noiseless and durable journal bearing for the ends of shaft 1, in the following manner constituting a preferred construction which is believed to be novel, although I do not claim it herein. The supporting posts or standards 14 are transversely apertured or bored out in line with the shaft to receive a pair of cylindrical bearing blocks 15 held in place by set-screws 16. The shaft-journals 17 occupy bearing holes 19 formed axially in the inner ends of said blocks and communicating with holes 18 formed radially or transversely therein. These holes 18 are covered by the posts 14, being located within the apertures in the latter, and they may contain a lubricant such as grease. By drilling the transverse holes 18 first, then drilling the longitudinal bearing-holes 19 and finally reaming the latter, the reamer can be run clear through the holes 19 and will cut an accurate bearing for the journals 17, wherein the latter will run noiselessly and without appreciable wear if properly lubricated.

My invention may be embodied in various forms and is not confined to the exact construction illustrated, especially with regard to the particular character of the frictional or slipping connection.

I claim:

1. In a speed regulator for talking machines, the combination of a driven shaft, a spring thereon carrying a centrifugal weight, a slipping connection between said spring and shaft, and a brake controlled by one end of said spring.

2. A centrifugal governor comprising a driven shaft, springs carrying centrifugal weights, a hub or collar to which one end of each of said springs is attached, having a frictional slipping connection with the shaft, and a brake disk slidable on the shaft, to which the other end of each spring is attached.

3. A centrifugal governor comprising a driven shaft, a hub or collar rotatably mounted thereon, flat springs attached to said collar and having a frictional slipping connection with the shaft, and centrifugal weights carried by said springs.

4. A centrifugal governor comprising a driven shaft, a braking disk rotatably and axially movable on said shaft, flat springs attached by one end to said disk, a hub to which the other ends of the springs are attached, said hub being rotatable on the shaft and the springs having terminal portions or extensions, and a collar fixed to the shaft and frictionally engaged by said spring extensions.

5. A centrifugal governor comprising a driven shaft, a pair of spaced collars fixed thereto, one of which has a conical flange, a third collar rotatably mounted between said fixed collars, and flat springs carrying centrifugal weights and having extensions which bear frictionally against said flange.

In testimony whereof I have hereunto set my hand this 30th day of April, 1917.

THOMAS W. KIRKMAN.